US008178619B2

(12) United States Patent
Sato et al.

(10) Patent No.: US 8,178,619 B2
(45) Date of Patent: May 15, 2012

(54) (METH)ACRYLIC POLYMER AND VINYL CHLORIDE RESIN COMPOSITION CONTAINING THE SAME

(75) Inventors: Mitsutaka Sato, Akashi (JP); Yasushi Nakanishi, Osaka (JP)

(73) Assignee: Kaneka Corporation, Osaka (JP)

( * ) Notice: Subject to any disclaimer, the term of this patent is extended or adjusted under 35 U.S.C. 154(b) by 758 days.

(21) Appl. No.: 11/887,210

(22) PCT Filed: Mar. 8, 2006

(86) PCT No.: PCT/JP2006/304431
§ 371 (c)(1),
(2), (4) Date: Sep. 26, 2007

(87) PCT Pub. No.: WO2006/112192
PCT Pub. Date: Oct. 26, 2006

(65) Prior Publication Data
US 2009/0023864 A1    Jan. 22, 2009

(30) Foreign Application Priority Data
Mar. 30, 2005 (JP) ................................. 2005-097609

(51) Int. Cl.
C08F 220/14    (2006.01)
C08F 265/06    (2006.01)
C08L 51/00     (2006.01)
C08L 27/06     (2006.01)

(52) U.S. Cl. .......................................... 525/80; 525/228
(58) Field of Classification Search .................... 525/80, 525/228
See application file for complete search history.

(56) References Cited

U.S. PATENT DOCUMENTS

| | | | |
|---|---|---|---|
| 3,882,198 A | 5/1975 | Miller | |
| 3,957,917 A | 5/1976 | Kitaguchi et al. | |
| 4,166,900 A * | 9/1979 | Heimsch et al. | 528/491 |
| 4,520,166 A * | 5/1985 | Kamada et al. | 525/85 |
| 5,055,529 A | 10/1991 | Kishida et al. | |
| 5,371,149 A * | 12/1994 | Kishida et al. | 525/309 |
| 6,730,741 B1 | 5/2004 | Honda et al. | |
| 2004/0116580 A1 | 6/2004 | Sakashita et al. | |
| 2004/0171741 A1 | 9/2004 | Sato et al. | |
| 2005/0119393 A1 | 6/2005 | Ahn et al. | |

FOREIGN PATENT DOCUMENTS

| | | |
|---|---|---|
| JP | 52-1746 | 1/1977 |
| JP | 53-2898 | 2/1978 |
| JP | 1-247409 | 10/1989 |
| JP | 5-140395 | 6/1993 |
| JP | 6-240086 | 8/1994 |
| JP | 11-228632 | 8/1999 |
| JP | 11-279353 | 10/1999 |
| JP | 2001-31826 | 2/2001 |
| JP | 2003-12881 | 1/2003 |
| JP | 2003-20376 | 1/2003 |
| WO | 00/12621 | 3/2000 |
| WO | 03/062292 | 7/2003 |

OTHER PUBLICATIONS

Supplementary European Search Report dated Mar. 28, 2008 issued in connection with EP Application No. 06 72 8750 corresponding to the present U.S. application.
International Search Report issued May 23, 2006 in the International (PCT) Application PCT/JP2006/304431 of which the present application is the U.S. National Stage.
International Preliminary Report on Patentability in the International (PCT) Application PCT/JP2006/304431 of which the present application is the U.S. National Stage.
PCT Written Opinion in the International (PCT) Application PCT/JP2006/304431 of which the present application is the U.S. National Stage.

* cited by examiner

*Primary Examiner* — Jeffrey Mullis
(74) *Attorney, Agent, or Firm* — Wenderoth, Lind & Ponack, L.L.P.

(57) ABSTRACT

The present invention provides a (meth)acrylic polymer containing 15 to 65 parts by weight of a polymer (A) having a specific viscosity of 0.90 to 2.00 and containing 70 to 100 weight percent of methyl methacrylate, 0 to 30 weight percent of a (meth)acrylic ester other than methyl methacrylate, and 0 to 10 weight percent of another monomer copolymerizable with these; 20 to 75 parts by weight of a polymer (B) having a specific viscosity of 0.40 or more and less than 0.90 and containing 70 to 100 weight percent of methyl methacrylate, 0 to 30 weight percent of a (meth)acrylic ester other than methyl methacrylate, and 0 to 10 weight percent of another monomer copolymerizable with these; and 1 to 30 parts by weight of a polymer (C) having a specific viscosity of 0.80 to 2.00 and containing 0 to 60 weight percent of methyl methacrylate, 40 to 100 weight percent of a (meth)acrylic ester other than methyl methacrylate, and 0 to 20 weight percent of another monomer copolymerizable with these (the total of the polymer (A), the polymer (B), and the polymer (C) is 100 parts by weight).

8 Claims, No Drawings

(METH)ACRYLIC POLYMER AND VINYL CHLORIDE RESIN COMPOSITION CONTAINING THE SAME

TECHNICAL FIELD

The present invention relates to a (meth)acrylic polymer and a vinyl chloride-based resin composition containing the same.

BACKGROUND ART

Vinyl chloride-based resins are widely used for a molding material and the like using the characteristics thereof, but have various problems relating to the processing. For example, the thermal decomposition temperature is close to the processing temperature and flowability is insufficient. To overcome these problems, various techniques are known. The main techniques include a method of copolymerizing another monomer with vinyl chloride and a method of mixing a plasticizer or another resin-like substance with a vinyl chloride-based resin.

However, these methods are disadvantageous in that the above problems relating to the processing cannot be solved while the excellent physical and chemical properties peculiar to vinyl chloride-based resins are maintained. For example, when a plasticizer is added or another monomer is copolymerized with vinyl chloride, the mechanical strength of the resulting moldings disadvantageously decreases. On the other hand, in the method of mixing another resin-like substance, in most cases, the processability is apparently improved by decreasing the melt viscosity of the resin. However, because of unsatisfactory compatibility with the vinyl chloride-based resin, gelation is insufficient, resulting in a degradation of mechanical properties and transparency of the resulting moldings.

To overcome these problems, a method in which a (meth)acrylic polymer mainly composed of methyl methacrylate is mixed as a processability modifier in order to accelerate the gelation during mold processing of a vinyl chloride-based resin and improve the appearance of the resulting moldings is proposed (for example, refer to Patent Documents 1 and 2). According to this method, moldings of a vinyl chloride-based resin having high degree of gelation can be produced without degrading the characteristics of the vinyl chloride-based resin. Thus, the processability can be improved while mechanical properties and transparency of the moldings are maintained. Furthermore, it is known that the breaking elongation at high temperatures is improved; thereby the resin can be applied to not only deep-draw molding but also vacuum forming and profile extrusion.

However, in the case where the (meth)acrylic polymer is mixed as a processability modifier, under some mixing conditions and molding conditions, further improvement in the above characteristics is desired. For example, when the vinyl chloride-based resin composition is molded to the shape of the die by profile extrusion or injection molding, the mechanical properties can be improved by increasing the degree of gelation of the vinyl chloride-based resin. However, because of high elastic recovering force, sink and warping are generated in moldings, resulting in the degradation of the commercial value of the moldings. In addition, when the vinyl chloride-based resin composition is formed into a sheet by calendering or the like, the occurrence of air marks can be suppressed but flow marks are generated on the surface of the sheet, resulting in the degradation of the commercial value of the molded articles.

As described above, under the present situation, the improvement of physical properties, for example, further improvement of processability is desired in vinyl chloride-based resin compositions.

[Patent Document 1] Japanese Examined Patent Application Publication No. 52-1746
[Patent Document 2] Japanese Examined Patent Application Publication No. 53-2898

DISCLOSURE OF INVENTION

Problems to be Solved by the Invention

An object of the present invention is to provide a (meth)acrylic polymer that solves the above problems and that improves the processability and the like of a vinyl chloride-based resin composition, and a vinyl chloride-based resin composition containing the (meth)acrylic polymer. In particular, an object of the present invention is to provide a (meth)acrylic polymer that prevents air marks from being generated during calendering and that suppresses the occurrence of flow marks at the same time, and a vinyl chloride-based resin composition containing the same.

Means for Solving the Problems

In view of the above-described problems, the present inventors have conducted intensive studies and found that a specific (meth)acrylic polymer and a vinyl chloride-based resin composition containing the (meth)acrylic polymer specifically bring about an effect of solving the above problems. This finding resulted in completion of the present invention.

Namely, a first aspect of the present invention relates to a (meth)acrylic polymer containing 15 to 65 parts by weight of a polymer (A) having a specific viscosity of 0.90 to 2.00 and containing 70 to 100 weight percent of methyl methacrylate, 0 to 30 weight percent of a (meth)acrylic ester other than methyl methacrylate, and 0 to 10 weight percent of another monomer copolymerizable with these; 20 to 75 parts by weight of a polymer (B) having a specific viscosity of 0.40 or more and less than 0.90 and containing 70 to 100 weight percent of methyl methacrylate, 0 to 30 weight percent of a (meth)acrylic ester other than methyl methacrylate, and 0 to 10 weight percent of another monomer copolymerizable with these; and 1 to 30 parts by weight of a polymer (C) having a specific viscosity of 0.80 to 2.00 and containing 0 to 60 weight percent of methyl methacrylate, 40 to 100 weight percent of a (meth)acrylic ester other than methyl methacrylate, and 0 to 20 weight percent of another monomer copolymerizable with these (the total of the polymer (A), the polymer (B), and the polymer (C) is 100 parts by weight).

A preferred embodiment relates to the above (meth)acrylic polymer, wherein when the specific viscosity of the polymer (A) is represented as a and the specific viscosity of the polymer (B) is represented as b, a/b is 1.2 to 3.2.

A preferred embodiment relates to any one of the above (meth)acrylic polymers, wherein the (meth)acrylic polymer is a multistage polymer containing the polymer (A), the polymer (B), and the polymer (C).

A preferred embodiment relates to the above (meth)acrylic polymer, wherein the multistage polymer is prepared by multistage polymerization in the order of the polymer (A), the polymer (B), and the polymer (C).

A preferred embodiment relates to the above (meth)acrylic polymer, wherein the multistage polymer is prepared by multistage polymerization in the order of the polymer (B), the polymer (A), and the polymer (C).

A second aspect of the present invention relates to a vinyl chloride-based resin composition containing 100 parts by weight of a vinyl chloride-based resin and 0.1 to 20 parts by weight of any one of the above (meth)acrylic polymers.

Effects of the Invention

The vinyl chloride-based resin composition containing the (meth)acrylic polymer of the present invention can improve, for example, the gelation property during a molding process without degrading excellent physical properties that is inherently possessed by vinyl chloride-based resins. In particular, when the vinyl chloride-based resin composition is used for calendering, air marks can be reduced during forming a sheet and the occurrence of flow marks can also be suppressed at the same time. Accordingly, excellent moldings can be produced.

BEST MODE FOR CARRYING OUT THE INVENTION

The (meth)acrylic polymer in the present invention contains 15 to 65 parts by weight of a polymer (A) having a specific viscosity of 0.90 to 2.00 and containing 70 to 100 weight percent of methyl methacrylate, 0 to 30 weight percent of a (meth)acrylic ester other than methyl methacrylate, and 0 to 10 weight percent of another monomer copolymerizable with these; 20 to 75 parts by weight of a polymer (B) having a specific viscosity of 0.40 or more and less than 0.90 and containing 70 to 100 weight percent of methyl methacrylate, 0 to 30 weight percent of a (meth)acrylic ester other than methyl methacrylate, and 0 to 10 weight percent of another monomer copolymerizable with these; and 1 to 30 parts by weight of a polymer (C) having a specific viscosity of 0.80 to 2.00 and containing 0 to 60 weight percent of methyl methacrylate, 40 to 100 weight percent of a (meth)acrylic ester other than methyl methacrylate, and 0 to 20 weight percent of another monomer copolymerizable with these (the total of the polymer (A), the polymer (B), and the polymer (C) is 100 parts by weight). In the present invention, the term "(meth) acrylic" represents acrylic and/or methacrylic unless otherwise specified.

The polymer (A) used in the (meth)acrylic polymer of the present invention includes, as the components, 70 to 100 weight percent of methyl methacrylate, 0 to 30 weight percent of a (meth)acrylic ester other than methyl methacrylate, and 0 to 10 weight percent of another monomer copolymerizable with these, and can be obtained by polymerizing the monomer (or a mixture of the monomers).

The ratio of methyl methacrylate in the polymer (A) is preferably 70 to 100 weight percent, more preferably 80 to 100 weight percent, further preferably 90 to 100 weight percent, and particularly preferably 90 to 99 weight percent. When the ratio of methyl methacrylate in the polymer (A) is less than 70 weight percent, the effect of accelerating gelation when mixed in a vinyl chloride-based resin may not be sufficiently achieved or the transparency that is inherently possessed by the vinyl chloride-based resin may be impaired.

The (meth)acrylic ester other than methyl methacrylate that is a component of the polymer (A) is not particularly limited as long as the component is an ester of acrylic acid or methacrylic acid, the ester being other than methyl methacrylate. From the viewpoints of the expression of physical properties and the ease of availability, an alkyl methacrylate having an alkyl group of 2 to 8 carbon atoms and/or an alkyl acrylate having an alkyl group of 1 to 8 carbon atoms is preferred.

Examples of the alkyl methacrylate having an alkyl group of 2 to 8 carbon atoms and/or the alkyl acrylate having an alkyl group of 1 to 8 carbon atoms include ethyl methacrylate, propyl methacrylate, n-butyl methacrylate, iso-butyl methacrylate, tert-butyl methacrylate, 2-ethylhexyl methacrylate, methyl acrylate, ethyl acrylate, propyl acrylate, n-butyl acrylate, 2-ethylhexyl acrylate, and octyl acrylate. Furthermore, examples of other (meth)acrylic ester include alkyl methacrylates each having an alkyl group of 9 or more carbon atoms, such as lauryl methacrylate, stearyl methacrylate, and tridecyl methacrylate; alkyl acrylates each having an alkyl group of 9 or more carbon atoms, such as lauryl acrylate, stearyl acrylate, and tridecyl acrylate; glycidyl methacrylate; benzyl methacrylate; cyclohexyl methacrylate; 2-hydroxyethyl methacrylate; 4-hydroxybutyl methacrylate; glycidyl acrylate; benzyl acrylate; cyclohexyl acrylate; 2-hydroxyethyl acrylate; and 4-hydroxybutyl acrylate. These may be appropriately used alone or in combinations of two or more. Among these, from the viewpoint of industrial availability, butyl methacrylate and butyl acrylate are particularly preferred.

The ratio of the (meth)acrylic ester other than methyl methacrylate in the polymer (A) is preferably 0 to 30 weight percent, more preferably 0 to 20 weight percent, further preferably 0 to 10 weight percent, and particularly preferably 1 to 10 weight percent. When the ratio of the (meth)acrylic ester other than methyl methacrylate in the polymer (A) exceeds 30 weight percent, the effect of accelerating gelation when mixed in a vinyl chloride-based resin may not be sufficiently achieved or the transparency that is inherently possessed by the vinyl chloride-based resin may be impaired.

The other copolymerizable monomer that is a component of the polymer (A) is not particularly limited as long as the monomer is copolymerizable with methyl methacrylate and the (meth)acrylic ester other than methyl methacrylate. Examples thereof include aromatic vinyl compounds such as styrene, α-methylstyrene, chlorostyrene, vinylstyrene, and nucleus-substituted styrenes; and unsaturated nitriles such as acrylonitrile and methacrylonitrile. These may be appropriately used alone or in combinations of two or more to such an extent that practical problems relating to the processability, the occurrence of air marks or flow marks, and the like do not occur when the (meth)acrylic polymer of the present invention is used as a processability modifier.

The ratio of the other copolymerizable monomer in the polymer (A) is preferably 0 to 10 weight percent and more preferably 0 to 5 weight percent. When the ratio of the other copolymerizable monomer is out of the above range, the effect of accelerating gelation when mixed in a vinyl chloride-based resin may not be sufficiently achieved or the transparency that is inherently possessed by the vinyl chloride-based resin may be impaired.

The polymer (B) used in the (meth)acrylic polymer of the present invention includes, as the components, 70 to 100 weight percent of methyl methacrylate, 0 to 30 weight percent of a (meth)acrylic ester other than methyl methacrylate, and 0 to 10 weight percent of another monomer copolymerizable with these, and can be obtained by polymerizing the monomer (or a mixture of the monomers).

The ratio of methyl methacrylate in the polymer (B) is preferably 70 to 100 weight percent, more preferably 80 to 100 weight percent, further preferably 90 to 100 weight percent, and particularly preferably 90 to 99 weight percent. When the ratio of methyl methacrylate in the polymer (B) is less than 70 weight percent, the effect of accelerating gelation when mixed in a vinyl chloride-based resin may not be sufficiently achieved or the transparency that is inherently possessed by the vinyl chloride-based resin may be impaired.

The (meth)acrylic ester other than methyl methacrylate that is a component of the polymer (B) is not particularly limited as long as the component is an ester of acrylic acid or methacrylic acid, the ester being other than methyl methacrylate. From the viewpoints of the expression of physical properties and the ease of availability, an alkyl methacrylate having an alkyl group of 2 to 8 carbon atoms and/or an alkyl acrylate having an alkyl group of 1 to 8 carbon atoms is preferred. Preferred examples of the alkyl methacrylate having an alkyl group of 2 to 8 carbon atoms and/or the alkyl acrylate having an alkyl group of 1 to 8 carbon atoms, and the other (meth)acrylic ester include the same monomers as those described as examples of the above (meth)acrylic ester other than methyl methacrylate that is a component of the polymer (A). These may be appropriately used alone or in combinations of two or more. Among them, from the viewpoint of industrial availability, butyl methacrylate and butyl acrylate are particularly preferred.

The ratio of the (meth)acrylic ester other than methyl methacrylate in the polymer (B) is preferably 0 to 30 weight percent, more preferably 0 to 20 weight percent, further preferably 0 to 10 weight percent, and particularly preferably 1 to 10 weight percent. When the ratio of the (meth)acrylic ester other than methyl methacrylate in the polymer (B) exceeds 30 weight percent, the effect of accelerating gelation when mixed in a vinyl chloride-based resin may not be sufficiently achieved or the transparency that is inherently possessed by the vinyl chloride-based resin may be impaired.

The other copolymerizable monomer that is a component of the polymer (B) is not particularly limited as long as the monomer is copolymerizable with methyl methacrylate and the (meth)acrylic ester other than methyl methacrylate. Preferred examples thereof include the same monomers as those described as examples of the above other copolymerizable monomer that is a component of the polymer (A). These may be appropriately used alone or in combinations of two or more to such an extent that practical problems relating to the processability, the occurrence of air marks or flow marks, and the like do not occur when the (meth)acrylic polymer of the present invention is used as a processability modifier.

The ratio of the other copolymerizable monomer in the polymer (B) is preferably 0 to 10 weight percent and more preferably 0 to 5 weight percent. When the ratio of the other copolymerizable monomer is out of the above range, the effect of accelerating gelation when mixed in a vinyl chloride-based resin may not be sufficiently achieved or the transparency that is inherently possessed by the vinyl chloride-based resin may be impaired.

The polymer (C) used in the (meth)acrylic polymer of the present invention includes, as the components, 0 to 60 weight percent of methyl methacrylate, 40 to 100 weight percent of a (meth)acrylic ester other than methyl methacrylate, and 0 to 20 weight percent of another monomer copolymerizable with these, and can be obtained by polymerizing the monomer (or a mixture of the monomers).

The ratio of methyl methacrylate in the polymer (C) is preferably 0 to 60 weight percent, more preferably 1 to 50 weight percent, and particularly preferably 2 to 40 weight percent. When the ratio of methyl methacrylate in the polymer (C) exceeds 60 weight percent, the effect of accelerating gelation when mixed in a vinyl chloride-based resin may not be sufficiently achieved or the transparency that is inherently possessed by the vinyl chloride-based resin may be impaired.

The (meth)acrylic ester other than methyl methacrylate that is a component of the polymer (C) is not particularly limited as long as the component is an ester of acrylic acid or methacrylic acid, the ester being other than methyl methacrylate. From the viewpoints of the expression of physical properties and the ease of availability, an alkyl methacrylate having an alkyl group of 2 to 8 carbon atoms and/or an alkyl acrylate having an alkyl group of 1 to 8 carbon atoms is preferred. Preferred examples of the alkyl methacrylate having an alkyl group of 2 to 8 carbon atoms and/or the alkyl acrylate having an alkyl group of 1 to 8 carbon atoms, and the other (meth)acrylic ester include the same monomers as those described as examples of the above (meth)acrylic ester other than methyl methacrylate that is a component of the polymer (A) or the polymer (B). These may be appropriately used alone or in combinations of two or more. Among them, from the viewpoint of industrial availability, butyl methacrylate and butyl acrylate are particularly preferred.

The ratio of the (meth)acrylic ester other than methyl methacrylate in the polymer (C) is preferably 40 to 100 weight percent, more preferably 50 to 99 weight percent, and particularly preferably 60 to 98 weight percent. When the ratio of the (meth)acrylic ester other than methyl methacrylate in the polymer (C) is less than 40 weight percent, the effect of accelerating gelation when mixed in a vinyl chloride-based resin may not be sufficiently achieved or the transparency that is inherently possessed by the vinyl chloride-based resin may be impaired.

The other copolymerizable monomer that is a component of the polymer (C) is not particularly limited as long as the monomer is copolymerizable with methyl methacrylate and the (meth)acrylic ester other than methyl methacrylate. Preferred examples thereof include the same monomers as those described as examples of the above other copolymerizable monomer that is a component of the polymer (A) or the polymer (B). These may be appropriately used alone or in combinations of two or more to such an extent that practical problems relating to the processability, the occurrence of air marks or flow marks, and the like do not occur when the (meth)acrylic polymer of the present invention is used as a processability modifier.

The ratio of the other copolymerizable monomer in the polymer (C) is preferably 0 to 20 weight percent, more preferably 0 to 15 weight percent, and particularly preferably 0 to 10 weight percent. When the ratio of the other copolymerizable monomer is out of the above range, the effect of accelerating gelation when mixed in a vinyl chloride-based resin may not be sufficiently achieved or the transparency that is inherently possessed by the vinyl chloride-based resin may be impaired.

In the polymer (A), the polymer (B), and the polymer (C) in the present invention, it is necessary that the specific viscosity when the polymer is dissolved in a solvent under a specific condition is adjusted to a specific range. In the present invention, the term "specific viscosity" means a value determined by measuring at 30° C. a solution prepared by dissolving 0.4 g of a polymer in 100 cc of toluene. In addition, in the present invention, the specific viscosity of the polymer (A) is represented by a, the specific viscosity of the polymer (B) is represented by b, and the specific viscosity of the polymer (C) is represented by c.

The specific viscosity a of the polymer (A) in the present invention is preferably set in the range of 0.90 to 2.00, further preferably 0.95 to 1.60, and particularly preferably 1.00 to 1.40. In the case where the specific viscosity a of the polymer (A) exceeds 2.00, when a sheet or the like is formed using the vinyl chloride-based resin composition of the present invention, the transparency may be degraded or an unmelted substance called fish-eye (hereinafter also referred to as F.E.) tends to be generated. On the other hand, in the case where the specific viscosity a of the polymer (A) is less than 0.90, the gloss of a formed body of the vinyl chloride-based resin composition of the present invention may be degraded or when a sheet or the like is formed by calendering, the gloss may be degraded and the effect of improving the air mark problem may be insufficient.

The specific viscosity b of the polymer (B) in the present invention is preferably set in the range of 0.40 or more and less than 0.90, further preferably 0.45 to 0.85, and particularly preferably 0.50 to 0.80. In the case where the specific viscosity b of the polymer (B) is 0.90 or more, when a sheet or the like is formed by calendering, a flow mark that may cause a problem in practical use tends to be generated. On the other hand, in the case where the specific viscosity b of the polymer (B) is less than 0.40, the effect of accelerating gelation when mixed in a vinyl chloride-based resin may not be sufficiently achieved.

From the viewpoint that the occurrence of flow marks and the occurrence of air marks are suppressed at the same time, the relationship between the specific viscosity a of the polymer (A) and the specific viscosity b of the polymer (B) in the present invention is preferably set so that a/b is in the range of 1.2 to 3.2, more preferably 1.5 to 3.0, and particularly preferably 1.5 to 2.5.

The specific viscosity c of the polymer (C) in the present invention is preferably set in the range of 0.80 to 2.00, more preferably 0.90 to 1.80, and further preferably 1.00 to 1.60. In the case where the specific viscosity c of the polymer (C) is less than 0.80, when the (meth)acrylic polymer of the present invention is used as a processability modifier of a vinyl chloride-based resin and, for example, a sheet is formed by calendering, the effect of improving the air mark problem is not sufficient and the ability of accelerating gelation of the vinyl chloride-based resin tends to be decreased. On the other hand, in the case where the specific viscosity c of the polymer (C) exceeds 2.00, when a sheet is formed by calendering in the same manner, a flow mark that may cause a problem in practical use tends to be generated.

The specific viscosity of the polymers can be adjusted by, for example, polymerization conditions. Specifically, examples thereof include the adjustment of the amount of a polymerization initiator (catalyst) used in polymerization, the adjustment of the amount of a chain transfer agent used in polymerization, and the adjustment of the polymerization temperature. More specifically, the specific viscosity of the polymers can be increased by decreasing the amount of the polymerization initiator (catalyst), by decreasing the amount of the chain transfer agent, or by decreasing the polymerization temperature. On the other hand, the specific viscosity of the polymers can be decreased by increasing the amount of the polymerization initiator (catalyst), by increasing the amount of the chain transfer agent, or by increasing the polymerization temperature.

In the present invention, the (meth)acrylic polymer contains 15 to 65 parts by weight of the polymer (A), 20 to 75 parts by weight of the polymer (B), and 1 to 30 parts by weight of the polymer (C) (the total of the polymer (A), the polymer (B), and the polymer (C) is 100 parts by weight).

The polymer (A) in the (meth)acrylic polymer can be contained in an amount of 15 to 65 parts by weight, preferably 15 to 60 parts by weight, more preferably 20 to 45 parts by weight, and particularly preferably 20 to 40 parts by weight. In the case where the content of the polymer (A) in the (meth)acrylic polymer is less than 15 parts by weight, when a sheet or the like is formed by calendering, an air mark that may cause a problem in practical use tends to be generated. On the other hand, in the case where the content exceeds 65 parts by weight, when a sheet or the like is formed by calendering, a flow mark that may cause a problem in practical use may be generated.

The polymer (B) in the (meth)acrylic polymer can be contained in an amount of 20 to 75 parts by weight, preferably 30 to 75 parts by weight, more preferably 40 to 65 parts by weight, and particularly preferably 45 to 65 parts by weight. In the case where the content of the polymer (B) in the (meth)acrylic polymer is less than 20 parts by weight, when a sheet or the like is formed by calendering, a flow mark that may cause a problem in practical use tends to be generated. On the other hand, in the case where the content exceeds 75 parts by weight, when a sheet or the like is formed by calendering, an air mark that may cause a problem in practical use may be generated.

The polymer (C) in the (meth)acrylic polymer can be contained in an amount of 1 to 30 parts by weight, preferably 5 to 25 parts by weight, and more preferably 10 to 20 parts by weight. In the case where the content of the polymer (C) in the (meth)acrylic polymer is less than 1 part by weight, when a sheet or the like is formed using the vinyl chloride-based resin composition of the present invention, the F.E. is generated and the appearance of the formed sheet tends to be degraded. On the other hand, in the case where the content exceeds 30 parts by weight, the ability of accelerating gelation of the vinyl chloride-based resin may be degraded.

The method for producing the (meth)acrylic polymer is not particularly limited as long as the (meth)acrylic polymer contains the predetermined amounts of the polymer (A), the polymer (B), and the polymer (C). For example, the respective polymers may be sequentially polymerized by multistage polymerization to prepare a (meth)acrylic polymer that is a multistage polymer. Alternatively, latices or powders of the resulting polymers (A), (B), and (C) may be blended to prepare the (meth)acrylic polymer. Specifically, examples of the method include the following.

An example is a method (1) of polymerizing the polymer (A), the polymer (B), and the polymer (C) in that order by multistage polymerization to produce a (meth)acrylic polymer that is a multistage polymer. Specifically, for example, in the presence of the polymer (A) prepared by polymerizing the monomer (or a mixture of the monomers) of the polymer (A), the monomer (or a mixture of the monomers) of the polymer (B) is added and polymerized. Thereby, a two-stage polymer (AB) in which the monomer (or a mixture of the monomers) (B) is polymerized using the polymer (A) as a site of polymerization can be prepared. In the presence of the two-stage polymer (AB), the monomer (or a mixture of the monomers) of the polymer (C) is added and polymerized. Thereby, the (meth)acrylic polymer, which is a three-stage polymer, can be similarly prepared.

Another is a method (2) of polymerizing the polymer (B), the polymer (A), and the polymer (C) in that order by multistage polymerization to produce a (meth)acrylic polymer that is a multistage polymer. Specifically, for example, in the presence of the polymer (B) prepared by polymerizing the monomer (or a mixture of the monomers) of the polymer (B), the monomer (or a mixture of the monomers) of the polymer (A) is added and polymerized. Thereby, a two-stage polymer (BA) in which the monomer (or a mixture of the monomers) (A) is polymerized using the polymer (B) as a site of polymerization can be prepared. In the presence of the two-stage polymer (BA), the monomer (or a mixture of the monomers) of the polymer (C) is added and polymerized. Thereby, the (meth)acrylic polymer, which is a three-stage polymer, can be similarly prepared.

Another is a method (3) of polymerizing the polymer (A), the polymer (C), and the polymer (B) in that order by multistage polymerization to produce a (meth)acrylic polymer that is a multistage polymer. Specifically, for example, in the presence of the polymer (A) prepared by polymerizing the monomer (or a mixture of the monomers) of the polymer (A), the monomer (or a mixture of the monomers) of the polymer (C) is added and polymerized. Thereby, a two-stage polymer (AC) in which the monomer (or a mixture of the monomers) (C) is polymerized using the polymer (A) as a site of polymerization can be prepared. In the presence of the two-stage polymer (AC), the monomer (or a mixture of the monomers) of the polymer (B) is added and polymerized. Thereby, the (meth)acrylic polymer, which is a three-stage polymer, can be similarly prepared.

Another is a method (4) of polymerizing the polymer (B), the polymer (C), and the polymer (A) in that order by multistage polymerization to produce a (meth)acrylic polymer that is a multistage polymer. Specifically, for example, in the presence of the polymer (B) prepared by polymerizing the monomer (or a mixture of the monomers) of the polymer (B), the monomer (or a mixture of the monomers) of the polymer (C) is added and polymerized. Thereby, a two-stage polymer (BC) in which the monomer (or a mixture of the monomers) (C) is polymerized using the polymer (B) as a site of polymerization can be prepared. In the presence of the two-stage polymer (BC), the monomer (or a mixture of the monomers) of the polymer (A) is added and polymerized. Thereby, the (meth)acrylic polymer, which is a three-stage polymer, can be similarly prepared.

Another is a method (5) of polymerizing the polymer (C), the polymer (A), and the polymer (B) in that order by multistage polymerization to produce a (meth)acrylic polymer that is a multistage polymer. Specifically, for example, in the presence of the polymer (C) prepared by polymerizing the monomer (or a mixture of the monomers) of the polymer (C), the monomer (or a mixture of the monomers) of the polymer (A) is added and polymerized. Thereby, a two-stage polymer (CA) in which the monomer (or a mixture of the monomers) (A) is polymerized using the polymer (C) as a site of polymerization can be prepared. In the presence of the two-stage polymer (CA), the monomer (or a mixture of the monomers) of the polymer (B) is added and polymerized. Thereby, the (meth)acrylic polymer, which is a three-stage polymer, can be similarly prepared.

Another is a method (6) of polymerizing the polymer (C), the polymer (B), and the polymer (A) in that order by multistage polymerization to produce a (meth)acrylic polymer that is a multistage polymer. Specifically, for example, in the presence of the polymer (C) prepared by polymerizing the monomer (or a mixture of the monomers) of the polymer (C), the monomer (or a mixture of the monomers) of the polymer (B) is added and polymerized. Thereby, a two-stage polymer (CB) in which the monomer (or a mixture of the monomers) (B) is polymerized using the polymer (C) as a site of polymerization can be prepared. In the presence of the two-stage polymer (CB), the monomer (or a mixture of the monomers) of the polymer (A) is added and polymerized. Thereby, the (meth)acrylic polymer, which is a three-stage polymer, can be similarly prepared.

Examples of the method for preparing a (meth)acrylic polymer by blending latices or powders of the polymers include the following methods.

For example, a (meth)acrylic polymer can be obtained by a method (7) of mixing a latex ($\alpha$) of a two-stage polymer (AC) prepared by polymerizing the polymer (A) and the polymer (C) in that order by multistage polymerization with a latex ($\beta$) of a two-stage polymer (BC) prepared by polymerizing the polymer (B) and the polymer (C) in that order by multistage polymerization in a predetermined ratio.

Furthermore, an example is a method (8) of isolating the latex ($\alpha$) of the two-stage polymer (AC) and the latex ($\beta$) of the two-stage polymer (BC) as powdery (meth)acrylic polymers by a method described below, and mixing the polymers in the form of a powder so that each polymer is contained in a predetermined content.

Another is a method (9) of polymerizing the polymer (A) and the polymer (B) respectively, and then polymerizing the polymer (C) in the presence of a mixed latex of the polymer (A) and the polymer (B) prepared by mixing the latices of these in a predetermined ratio.

Another is a method (10) of polymerizing the polymer (A), the polymer (B), and the polymer (C) respectively, and mixing the respective latices in a predetermined ratio.

Another is a method (11) of isolating powdery polymers from respective latices of the polymer (A), the polymer (B), and the polymer (C) by a method described below, and mixing the polymers in the form of a powder so that each polymer is contained in a predetermined content.

The above methods can be appropriately selected for use according to the production equipment, the objective, and the like.

Among them, from the viewpoint that the production process is simple, the (meth)acrylic polymers that are multistage polymers represented in the above examples are preferred. From the viewpoint that the dispersibility of the (meth)acrylic polymer in a vinyl chloride-based resin is excellent, which is preferable in view of processability, and the amount of fine particles in the powder of the final products of the (meth) acrylic polymer is small, in particular, the above production method (1) or (2) is more preferred. Furthermore, from the viewpoint that the specific viscosity during multistage polymerization can be easily controlled, the above production method (1) is particularly preferred.

The polymerization method for preparing the (meth) acrylic polymer of the present invention is not particularly limited and examples of the method include emulsion polymerization, suspension polymerization, microsuspension polymerization, and solution polymerization. Among these, from the viewpoint that the molecular weight and the particle structure are easily controlled, that the method is suitable for industrial production, that multistage polymerization is easily applied, and the like, emulsion polymerization is most preferred.

For example, when a polymer is prepared by emulsion polymerization, the types and the amounts of an emulsifier, a polymerization initiator, a chain transfer agent, and the like are appropriately determined according to the objective so that desired polymers can be obtained, and polymerization can be performed.

Any known emulsifier can be used and examples of the emulsifier include anionic surfactants such as fatty acid salts, alkyl sulfate ester salts, alkylbenzene sulfonates, alkyl phosphate ester salts, and diester salts of sulfosuccinic acid; nonionic surfactants such as polyoxyethylene alkyl ethers, polyoxyethylene fatty acid esters, and glycerin fatty acid esters; and cationic surfactants such as alkylamine salts.

As the polymerization initiator, water-soluble or oil-soluble polymerization initiators and redox polymerization initiators can be used. Examples of the polymerization initiator include inorganic salt polymerization initiators represented by normal persulfates and the like, organic peroxides, and azo compounds. These may be used alone or the above compounds may be combined with a sulfite, hydrogen sulfite, a thiosulfate, a primary metal salt, sodium formaldehyde sulfoxylate, or the like and used as a redox polymerization initiator. Specific examples of the inorganic salt polymerization initiator that is particularly suitable for the polymerization initiator include sodium persulfate, potassium persulfate, and ammonium persulfate. Examples of the preferred organic peroxide include tert-butyl hydroperoxide, cumene hydroperoxide, tert-butylperoxy isopropyl carbonate, p-menthane hydroperoxide, 1,1,3,3-tetramethylbutyl hydroperoxide, benzoyl peroxide, and lauroyl peroxide.

Any known chain transfer agent can be used and preferred examples of the chain transfer agent include alkyl mercaptans each having a main chain having 4 to 12 carbon atoms. Specifically, examples thereof include n-octyl mercaptan, tert-octyl mercaptan, n-dodecyl mercaptan, tert-dodecyl mercaptan, and 2-ethylhexyl thioglycol.

An example of a method for isolating the (meth)acrylic polymer from the latex is a method in which acid coagulation is performed with an acid such as sulfuric acid, hydrochloric acid, or phosphoric acid or salting out is performed with an electrolyte represented by a salt such as sodium chloride, calcium chloride, magnesium chloride, aluminum chloride, sodium sulfate, magnesium sulfate, or aluminum sulfate, followed by heat treatment, washing, dehydration, and drying to isolate the powdery (meth)acrylic polymer. Alternatively, spray drying, freeze drying, or the like may be employed.

The vinyl chloride-based resin used in the vinyl chloride-based resin composition of the present invention is not particularly limited. Any vinyl chloride-based resin usually used can be used without particular limitation. Specifically, examples thereof include polyvinyl chloride, vinyl chloride resin-based copolymers preferably composed of 80 weight percent or more of vinyl chloride and 20 weight percent or less of a monomer copolymerizable with the vinyl chloride, and post-chlorinated polyvinyl chloride. Examples of the monomer copolymerizable with vinyl chloride include vinyl acetate, ethylene, propylene, styrene, vinyl bromide, vinylidene chloride, acrylic esters, and methacrylic esters. These may be used alone or in combinations of two or more.

Regarding the mixing ratio between the vinyl chloride-based resin and the (meth)acrylic polymer in the vinyl chloride-based resin composition of the present invention, the (meth)acrylic polymer is preferably 0.1 to 20 parts by weight, more preferably 0.1 to 10 parts by weight, and most preferably 0.1 to 5 parts by weight relative to 100 parts by weight of the vinyl chloride-based resin. When the amount of the (meth) acrylic polymer mixed is less than 0.1 parts by weight, air marks are generated and a problem relating to the effect of accelerating gelation of the vinyl chloride-based resin occurs. On the other hand, when the amount exceeds 20 parts by weight, the problem of flow marks occurs and a large load may be applied to a motor of a processing machine because of a significantly increased melt viscosity.

Additives such as a stabilizer, a lubricant, an impact modifier, a plasticizer, a coloring agent, a filler, and a foaming agent may be appropriately added to the vinyl chloride-based resin composition of the present invention as long as the advantages of the present invention are not impaired.

As described above, when the vinyl chloride-based resin composition of the present invention is applied to, for example, calendering, air marks can be reduced and the occurrence of flow marks can also be suppressed at the same time. Therefore, a glossy sheet can be produced. In addition, the vinyl chloride-based resin composition of the present invention can be used for producing other known vinyl chloride-based moldings.

EXAMPLES

The present invention will now be described more specifically on the basis of examples, but the present invention is not limited thereto.

Example 1

First, 200 parts by weight of water and 0.5 parts by weight of sodium di(2-ethylhexyl) sulfosuccinate were mixed and nitrogen purging was performed at 66° C. Subsequently, 0.07 parts by weight of potassium persulfate was added, and a monomer mixture (A) containing 32.34 parts by weight of methyl methacrylate (hereinafter also referred to as MMA) and 0.66 parts by weight of butyl acrylate (hereinafter also referred to as BA) was then continuously added under stirring over a period of 86 minutes. Stirring was further performed for one hour to conduct polymerization. The reaction was stopped to obtain a polymer (A) latex.

To the polymer (A) latex, 0.045 parts by weight of potassium persulfate was added. Subsequently, a monomer mixture (B) containing 48.02 parts by weight of MMA, 0.98 parts by weight of BA, and 0.0046 parts by weight of tert-dodecyl mercaptan (hereinafter also referred to as tDM) was continuously added over a period of 129 minutes. Stirring was further performed for one hour to conduct polymerization. The reaction was stopped to obtain a polymer (AB) latex.

To the polymer (AB) latex, a monomer mixture (C) containing 5.4 parts by weight of MMA and 12.6 parts by weight of BA was continuously added over a period of 46 minutes to conduct emulsion polymerization. Stirring was further performed for three hours to conduct polymerization. The reaction was stopped to obtain a (meth)acrylic polymer (ABC) latex.

The (meth)acrylic polymer (ABC) latex was coagulated with an aqueous solution of calcium chloride. Processes of heat treatment, washing, dehydration, and drying were then performed. Thus, a powdery polymer mixture was prepared and used for the following tests. Tables 1 and 4 show the results.

(i) Measurement of Specific Viscosity

First, 0.4 g of the prepared polymer was precisely weighed and dissolved in 100 cc of toluene. The specific viscosity was measured with an Ubbelohde viscometer in a water bath at 30° C. while the temperature was kept constant.

(ii) Flow Mark Test

The evaluation of flow marks was performed by visual inspection of a sheet. A roll sheet (sheet thickness: 0.5 mm, width 35 cm) prepared by kneading a resin composition for three minutes with an 8-inch labo test roll manufactured by Kansai Roll Co., Ltd. at a roll temperature of 200° C. with rotational speeds of 17 rpm of a front roll and 16 rpm of a rear roll was used as the sample for the evaluation. The roll sheet was observed and evaluated in a scale of 1 to 5 as follows. When a flow mark was hardly observed, the sheet was evaluated as 5. When a few flow marks were observed, the sheet was evaluated as 4. When flow marks were observed but the flow marks might not affect the practical use, the sheet was evaluated as 3. When flow marks were generated and the flow marks might adversely affect the practical use, the sheet was evaluated as 2. When flow marks were remarkably generated, the sheet was evaluated as 1.

A vinyl chloride-based resin composition used for the evaluation of flow marks was prepared as follows: To 100 parts by weight of a polyvinyl chloride resin (Kanevinyl S-1008, manufactured by Kaneka Corporation) having an average degree of polymerization of 800, 1.3 parts by weight of an octyltin-based stabilizer (17MOK-N, manufactured by Kyodo Chemical Co., Ltd.), 0.6 parts by weight of a polymer complex ester (Loxiol G-78, manufactured by Cognis Japan Ltd.), 0.6 parts by weight of a polyol ester (Loxiol GH4, manufactured by Cognis Japan Ltd.), and 10 parts by weight of an impact modifier (Kane Ace B-51, manufactured by Kaneka Corporation) were added and mixed with a Henschel mixer until the resin temperature reached 110° C. The mixture was then cooled to room temperature, and 2 parts by weight of the prepared powdery (meth)acrylic polymer was added to the mixture to prepare the vinyl chloride-based resin composition.

(iii) Air Mark Test

The evaluation of air marks was performed by visual inspection of a sheet. A roll sheet (sheet thickness: 1.0 mm, width 30 cm) prepared by kneading a resin composition for three minutes with an 8-inch labo test roll manufactured by Kansai Roll Co., Ltd. at a roll temperature of 180° C. with rotational speeds of 15 rpm of a front roll and 16 rpm of a rear roll was used as the sample for the evaluation. The roll sheet was observed and evaluated in a scale of 1 to 5 as follows. When an air mark was hardly observed, the sheet was evaluated as 5. When a few air marks were observed, the sheet was evaluated as 4. When air marks were observed but the air marks might not affect the practical use, the sheet was evaluated as 3. When air marks were generated and the air marks might adversely affect the practical use, the sheet was evaluated as 2. When air marks were remarkably generated, the sheet was evaluated as 1.

A vinyl chloride-based resin composition used for the evaluation of air marks was prepared as follows: To 100 parts by weight of a polyvinyl chloride resin (Kanevinyl S-1008, manufactured by Kaneka Corporation) having an average degree of polymerization of 800, 1.2 parts by weight of an octyltin-based stabilizer (17MOK-N, manufactured by Kyodo Chemical Co., Ltd.), 1.6 parts by weight of a polymer complex ester (Loxiol G-74, manufactured by Cognis Japan Ltd.), 0.9 parts by weight of a polyol ester (Loxiol G-16, manufactured by Cognis Japan Ltd.), and 10 parts by weight of an impact modifier (Kane Ace B-51, manufactured by Kaneka Corporation) were added and mixed with a Henschel mixer until the resin temperature reached 110° C. The mixture was then cooled to room temperature, and 2 parts by weight of the prepared powdery (meth)acrylic polymer was added to the mixture to prepare the vinyl chloride-based resin composition.

(iv) Gloss Evaluation Test

The gloss was evaluated with a glossmeter (micro-TRI-gloss, manufactured by Gardner) with an angle of 60 degrees. A roll sheet (sheet thickness: 0.4 mm, width 33 cm) prepared by kneading a resin composition for two minutes with an 8-inch labo test roll manufactured by Kansai Roll Co., Ltd. at a roll temperature of 198° C. with rotational speeds of 17 rpm of a front roll and 16 rpm of a rear roll was used as the sample for the evaluation. The gloss of a sheet surface which had been in contact with the roll was measured and evaluated in a scale of 1 to 5 as follows. A sheet having a gloss of 130 or more was evaluated as 5, a sheet having a gloss of 120 or more and less than 130 was evaluated as 4, a sheet having a gloss of 110 or more and less than 120 was evaluated as 3, a sheet having a gloss of 100 or more and less than 110 was evaluated as 2, and a sheet having a gloss of less than 100 was evaluated as 1.

A vinyl chloride-based resin composition used for the evaluation of gloss was prepared as follows: To 100 parts by weight of a polyvinyl chloride resin (Kanevinyl S-1008, manufactured by Kaneka Corporation) having an average degree of polymerization of 800, 1.0 part by weight of an butyltin-based stabilizer (Mark-17M, manufactured by Crompton Corporation), 0.4 parts by weight of a polymer complex ester (Loxiol G-78, manufactured by Cognis Japan Ltd.), 0.6 parts by weight of a polyol fatty acid ester (Loxiol G-16, manufactured by Cognis Japan Ltd.), and 6 parts by weight of an impact modifier (Kane Ace B-521, manufactured by Kaneka Corporation) were added and mixed with a Henschel mixer until the resin temperature reached 110° C. The mixture was then cooled to room temperature, and 1 part by weight of the prepared powdery (meth)acrylic polymer was added to the mixture to prepare the vinyl chloride-based resin composition.

(v) Fish Eye (F.E.) Evaluation Test

The roll sheet having a thickness of 0.5 mm, which was used in the evaluation of flow marks, was used in the evaluation of F.E. The F.E. was evaluated by determining the number of fish eyes in a predetermined area of the surface of the sheet by visual observation and evaluated with the following four levels. When no fish eye was observed, the sheet was evaluated as A. When fish eyes were observed but the fish eyes might not affect the practical use, the sheet was evaluated as B. When fish eyes were remarkably observed and the fish eyes might adversely affect the practical use, the sheet was evaluated as C. When a sheet included a large number of fish eyes and was not suitable for practical use, the sheet was evaluated as D. The F.E. represents a small spherical solid, i.e., an unmelted substance, contained in a sheet.

(vi) Transparency Evaluation Test

The transparency was evaluated with a Σ80 Color Measuring System manufactured by Nippon Denshoku Industries Co., Ltd. A roll sheet (sheet thickness: 1.0 mm, width 35 cm) was prepared by kneading a resin composition for five minutes with an 8-inch labo test roll manufactured by Kansai Roll Co., Ltd. at a roll temperature of 170° C. with rotational speeds of 20 rpm of a front roll and 18 rpm of a rear roll. Then six or seven roll sheets were stacked and the set of roll sheets was pressed at a press temperature of 180° C. for 15 minutes to prepare a transparent sheet having a thickness of 5 mm. The transparent sheet was used as the sample for the evaluation. The evaluation was performed with the following four levels. A sheet having a total light transmittance (T %) of 75% or more was evaluated as A, a sheet having a total light transmittance (T %) of 70% or more and less than 75% was evaluated as B, a sheet having a total light transmittance (T %) of 65% or more and less than 70% was evaluated as C, and a sheet having a total light transmittance (T %) of less than 65% was evaluated as D.

A vinyl chloride-based resin composition used for the evaluation of transparency was prepared as follows: To 100 parts by weight of a polyvinyl chloride resin (Kanevinyl S-1008, manufactured by Kaneka Corporation) having an average degree of polymerization of 800, 1.2 parts by weight of an octyltin-based stabilizer (17MOK-N, manufactured by Kyodo Chemical Co., Ltd.), 1.6 parts by weight of a polymer complex ester (Loxiol G-74, manufactured by Cognis Japan Ltd.), 0.9 parts by weight of a polyol ester (Loxiol G-16, manufactured by Cognis Japan Ltd.), and 10 parts by weight of an impact modifier (Kane Ace B-51, manufactured by Kaneka Corporation) were added and mixed with a Henschel mixer until the resin temperature reached 110° C. The mixture was then cooled to room temperature, and 5 parts by weight of the prepared powdery (meth)acrylic polymer was added to the mixture to prepare the vinyl chloride-based resin composition.

(vii) Gelation Evaluation Test

The gelation evaluation test was performed with a Labo Plastomill manufactured by Toyo Seiki Seisaku-Sho Ltd. In the evaluation, when kneading was performed at an initial temperature of 90° C., at a finishing temperature of 160° C., with a heating rate of 4° C./min, at a rotational speed of 30 rpm, and with a charging weight of 60 g, the maximum torque and the time (hereinafter referred to as gelation time) required for reaching the maximum torque were measured. A shorter gelation time means that gelation occurs quickly.

A vinyl chloride-based resin composition used for the gelation test was prepared as follows: To 100 parts by weight of a polyvinyl chloride resin (Kanevinyl S-1008, manufactured by Kaneka Corporation) having an average degree of polymerization of 800, 1.0 part by weight of an butyltin-based stabilizer (Mark-17M, manufactured by Crompton Corporation), 0.4 parts by weight of a polymer complex ester (Loxiol G-78, manufactured by Cognis Japan Ltd.), 0.6 parts by weight of a polyol fatty acid ester (Loxiol G-16, manufactured by Cognis Japan Ltd.), and 6 parts by weight of an impact modifier (Kane Ace B-521, manufactured by Kaneka Corporation) were added and mixed with a Henschel mixer until the resin temperature reached 110° C. The mixture was then cooled to room temperature, and 4 parts by weight of the prepared powdery (meth)acrylic polymer was added to the mixture to prepare the vinyl chloride-based resin composition.

Example 2

A powdery (meth)acrylic polymer was prepared as in Example 1 except that the monomer mixture (A) in Example 1 was composed of 29.4 parts by weight of MMA and 0.6 parts by weight of BA; the time required for adding the monomer mixture (A) was 79 minutes; the amount of potassium persulfate used in polymerization of the monomer mixture (B) was 0.025 parts by weight; the monomer mixture (B) was composed of 44.1 parts by weight of MMA, 0.9 parts by weight of BA, and 0.0084 parts by weight of tDM; the time required for adding the monomer mixture (B) was 118 minutes; the monomer mixture (C) was composed of 7.5 parts by weight of MMA and 17.5 parts by weight of BA; and the time required for adding the monomer mixture (C) was 63 minutes. The (meth)acrylic polymer was subjected to the same tests as those in Example 1. Tables 1 and 4 show the results.

Example 3

A powdery (meth)acrylic polymer was prepared as in Example 2 except that the monomer mixture (A) in Example 2 was composed of 27.44 parts by weight of MMA and 0.56 parts by weight of BA; the time required for adding the monomer mixture (A) was 74 minutes; the monomer mixture (B) was composed of 41.16 parts by weight of MMA, 0.84 parts by weight of BA, and 0.0079 parts by weight of tDM; the time required for adding the monomer mixture (B) was 110 minutes; the monomer mixture (C) was composed of 9.0 parts by weight of MMA and 21.0 parts by weight of BA; and the time required for adding the monomer mixture (C) was 75 minutes. The (meth)acrylic polymer was subjected to the same tests as those in Example 1. Tables 1 and 4 show the results.

Example 4

A powdery (meth)acrylic polymer was prepared as in Example 1 except that the monomer mixture (A) in Example 1 was composed of 17.64 parts by weight of MMA and 0.36 parts by weight of BA, the time required for adding the monomer mixture (A) was 47 minutes, the amount of potassium persulfate used in polymerization of the monomer mixture (B) was 0.14 parts by weight, the monomer mixture (B) was composed of 58.88 parts by weight of MMA and 5.12 parts by weight of BA, and the time required for adding the monomer mixture (B) was 168 minutes. The (meth)acrylic polymer was subjected to the same tests as those in Example 1. Tables 1 and 4 show the results.

Example 5

A powdery (meth)acrylic polymer was prepared as in Example 1 except that the monomer mixture (A) in Example 1 was composed of 22.54 parts by weight of MMA and 0.46 parts by weight of BA; the time required for adding the monomer mixture (A) was 60 minutes; the amount of potassium persulfate used in polymerization of the monomer mixture (B) was 0.035 parts by weight; the monomer mixture (B) was composed of 57.82 parts by weight of MMA, 1.18 parts by weight of BA, and 0.011 parts by weight of tDM; and the time required for adding the monomer mixture (B) was 155 minutes. The (meth)acrylic polymer was subjected to the same tests as those in Example 1. Tables 1 and 4 show the results.

Example 6

A powdery (meth)acrylic polymer was prepared as in Example 3 except that the monomer mixture (A) in Example 3 was composed of 48.02 parts by weight of MMA and 0.98 parts by weight of BA; the time required for adding the monomer mixture (A) was 129 minutes; the monomer mixture (B) was composed of 32.24 parts by weight of MMA, 0.66 parts by weight of BA, and 0.006 parts by weight of tDM; and the time required for adding the monomer mixture (B) was 86 minutes. The (meth)acrylic polymer was subjected to the same tests as those in Example 1. Tables 1 and 4 show the results.

Example 7

A powdery (meth)acrylic polymer was prepared as in Example 3 except that the monomer mixture (A) in Example 3 was composed of 38.22 parts by weight of MMA and 0.78 parts by weight of BA; the time required for adding the monomer mixture (A) was 102 minutes; the monomer mixture (B) was composed of 42.14 parts by weight of MMA, 0.86 parts by weight of BA, and 0.008 parts by weight of tDM; and the time required for adding the monomer mixture (B) was 113 minutes. The (meth)acrylic polymer was subjected to the same tests as those in Example 1. Tables 1 and 4 show the results.

Example 8

A powdery (meth)acrylic polymer was prepared as in Example 1 except that the amount of potassium persulfate used in polymerization of the monomer mixture (A) in Example 1 was 0.06 parts by weight, the monomer mixture (A) was composed of 33 parts by weight of MMA, the time required for adding the monomer mixture (A) was 86 minutes, the amount of potassium persulfate used in polymerization of the monomer mixture (B) was 0.25 parts by weight, the monomer mixture (B) was composed of 49 parts by weight of MMA, and the time required for adding the monomer mixture (B) was 129 minutes. The (meth)acrylic polymer was subjected to the same tests as those in Example 1. Tables 1 and 4 show the results.

Example 9

A powdery (meth)acrylic polymer was prepared as in Example 1 except that the amount of potassium persulfate used in polymerization of the monomer mixture (A) in Example 1 was 0.045 parts by weight; the monomer mixture (A) was composed of 26.4 parts by weight of MMA and 6.6 parts by weight of butyl methacrylate (hereinafter also referred to as BMA); the time required for adding the monomer mixture (A) was 117 minutes; the amount of potassium persulfate used in polymerization of the monomer mixture (B) was 0.075 parts by weight; the monomer mixture (B) was composed of 48.02 parts by weight of MMA, 0.98 parts by weight of BA, and 0.009 parts by weight of tDM; and the time required for adding the monomer mixture (B) was 129 minutes. The (meth)acrylic polymer was subjected to the same tests as those in Example 1. Tables 1 and 4 show the results.

Example 10

A powdery (meth)acrylic polymer was prepared as in Example 9 except that the amount of potassium persulfate used in polymerization of the monomer mixture (A) in Example 9 was 0.025 parts by weight, the amount of potassium persulfate used in polymerization of the monomer mixture (B) was 0.10 parts by weight, and the monomer mixture (B) was composed of 45.08 parts by weight of MMA and 3.92 parts by weight of BA. The (meth)acrylic polymer was subjected to the same tests as those in Example 1. Tables 1 and 4 show the results.

Example 11

A powdery (meth)acrylic polymer was prepared as in Example 1 except the following operations. First, 200 parts by weight of water and 0.5 parts by weight of sodium di(2-ethylhexyl) sulfosuccinate were mixed and nitrogen purging was performed at 80° C. Subsequently, 0.015 parts by weight of potassium persulfate was added, and a monomer mixture (A) containing 32.34 parts by weight of MMA and 0.66 parts by weight of BA was then continuously added under stirring over a period of 86 minutes. Stirring was further performed for one hour to conduct polymerization. The reaction was stopped to obtain a polymer (A) latex.

To the polymer (A) latex, 0.03 parts by weight of potassium persulfate was added. Subsequently, a monomer mixture (B) containing 48.02 parts by weight of MMA and 0.98 parts by weight of BA was continuously added over a period of 129 minutes. Stirring was further performed for one hour to conduct polymerization. The reaction was stopped to obtain a polymer (AB) latex.

To the polymer (AB) latex, a monomer mixture (C) containing 5.4 parts by weight of MMA and 12.6 parts by weight of BA was continuously added over a period of 30 minutes. Stirring was further performed for three hours and the reaction was then stopped. Thus, a (meth)acrylic polymer (ABC) latex was obtained. The resulting (meth)acrylic polymer was subjected to the same tests as those in Example 1. Tables 1 and 4 show the results.

Example 12

A powdery (meth)acrylic polymer was prepared as in Example 11 except that the monomer mixture (C) in Example 11 was added at once. The (meth)acrylic polymer was subjected to the same tests as those in Example 1. Tables 1 and 4 show the results.

Example 13

A powdery (meth)acrylic polymer was prepared as in Example 1 except that the amount of potassium persulfate used in polymerization of the monomer mixture (A) in Example 1 was 0.055 parts by weight; the monomer mixture (A) was composed of 25.08 parts by weight of MMA and 7.92 parts by weight of BMA; the time required for adding the monomer mixture (A) was 117 minutes; the amount of potassium persulfate used in polymerization of the monomer mixture (B) was 0.14 parts by weight; the monomer mixture (B) was composed of 37.24 parts by weight of MMA, 7.84 parts by weight of BMA, and 3.92 parts by weight of BA; and the time required for adding the monomer mixture (B) was 174 minutes. The (meth)acrylic polymer was subjected to the same tests as those in Example 1. Tables 1 and 4 show the results.

Example 14

A powdery (meth)acrylic polymer was prepared as in Example 1 except that the amount of potassium persulfate used in polymerization of the monomer mixture (B) in Example 1 was 0.12 parts by weight, the monomer mixture (B) was composed of 45.08 parts by weight of MMA and 3.92 parts by weight of BA, the time required for adding the monomer mixture (B) was 129 minutes, and the monomer mixture (C) was composed of 10.8 parts by weight of MMA and 7.2 parts by weight of BA. The (meth)acrylic polymer was subjected to the same tests as those in Example 1. Tables 1 and 4 show the results.

Example 15

A powdery (meth)acrylic polymer was prepared as in Example 1 except the following operations. First, 200 parts by weight of water and 0.5 parts by weight of sodium di(2-ethylhexyl) sulfosuccinate were mixed and nitrogen purging was performed at 66° C. Subsequently, 0.125 parts by weight of potassium persulfate was added, and a monomer mixture (C) containing 5.4 parts by weight of MMA and 12.6 parts by weight of BA was then continuously added under stirring over a period of 46 minutes. Stirring was further performed for one hour to conduct polymerization. The reaction was stopped to obtain a polymer (C) latex.

To the polymer (C) latex, a monomer mixture (B) containing 48.02 parts by weight of MMA and 0.98 parts by weight of BA was then continuously added over a period of 129 minutes. Stirring was further performed for one hour to conduct polymerization. The reaction was stopped to obtain a polymer (CB) latex.

To the polymer (CB) latex, a monomer mixture (A) containing 26.4 parts by weight of MMA and 6.6 parts by weight of BMA was continuously added over a period of 117 minutes. Stirring was further performed for three hours to conduct polymerization. The reaction was stopped to obtain a (meth)acrylic polymer (CBA) latex. The resulting (meth)acrylic polymer was subjected to the same tests as those in Example 1. Tables 1 and 4 show the results.

Example 16

A powdery (meth)acrylic polymer was prepared as in Example 1 except the following operations. First, 200 parts by weight of water and 0.5 parts by weight of sodium di(2-ethylhexyl) sulfosuccinate were mixed and nitrogen purging was performed at 66° C. Subsequently, 0.06 parts by weight of potassium persulfate was added, and a monomer mixture (A) containing 32.34 parts by weight of MMA and 0.66 parts by weight of BA was then continuously added under stirring over a period of 86 minutes. Stirring was further performed for one hour to conduct polymerization. The reaction was stopped to obtain a polymer (A) latex.

To the polymer (A) latex, 0.148 parts by weight of potassium persulfate was added. Subsequently, a monomer mixture (C) containing 5.4 parts by weight of MMA and 12.6 parts by weight of BA was then continuously added over a period of 46 minutes. Stirring was further performed for one hour to conduct polymerization. The reaction was stopped to obtain a polymer (AC) latex.

To the polymer (AC) latex, a monomer mixture (B) containing 39.2 parts by weight of MMA and 9.8 parts by weight of BMA was continuously added over a period of 174 minutes to conduct emulsion polymerization. Stirring was further performed for three hours to conduct polymerization. The reaction was stopped to obtain a (meth)acrylic polymer (ACB) latex. The resulting (meth)acrylic polymer was subjected to the same tests as those in Example 1. Tables 1 and 4 show the results.

Example 17

A powdery (meth)acrylic polymer was prepared as in Example 1 except the following operations. First, 200 parts by weight of water and 0.5 parts by weight of sodium di(2-ethylhexyl) sulfosuccinate were mixed and nitrogen purging was performed at 66° C. Subsequently, 0.125 parts by weight of potassium persulfate was added, and a monomer mixture ($C_1$) containing 1.5 parts by weight of MMA and 3.5 parts by weight of BA was then continuously added under stirring over a period of 13 minutes. Stirring was further performed for one hour to conduct polymerization. The reaction was stopped to obtain a polymer ($C_1$) latex.

To the polymer ($C_1$) latex, a monomer mixture (B) containing 48.02 parts by weight of MMA and 0.98 parts by weight of BA was then continuously added over a period of 129 minutes. Stirring was further performed for one hour to conduct polymerization. The reaction was stopped to obtain a polymer ($C_1B$) latex.

To the polymer ($C_1B$) latex, a monomer mixture (A) containing 26.4 parts by weight of MMA and 6.6 parts by weight of BMA was continuously added over a period of 117 minutes. Stirring was further performed for one hour to conduct polymerization. The reaction was stopped to obtain a polymer ($C_1BA$) latex.

To the polymer ($C_1BA$) latex, 0.05 parts by weight of potassium persulfate used in polymerization of a monomer mixture ($C_2$) was added. Subsequently, the monomer mixture ($C_2$) containing 3.9 parts by weight of MMA and 9.1 parts by weight of BA was continuously added over a period of 25 minutes. Stirring was further performed for three hours to conduct polymerization. The reaction was stopped to obtain a (meth)acrylic polymer ($C_1BAC_2$) latex. The resulting (meth)acrylic polymer was subjected to the same tests as those in Example 1. Tables 1 and 4 show the results.

Example 18

A powdery (meth)acrylic polymer was prepared as in Example 1 except the following operations. First, 200 parts by weight of water and 0.5 parts by weight of sodium di(2-ethylhexyl) sulfosuccinate were mixed and nitrogen purging was performed at 72° C. Subsequently, 0.035 parts by weight of potassium persulfate was added, and a monomer mixture (A) containing 98 parts by weight of MMA and 2 parts by weight of BA was then continuously added under stirring over a period of 260 minutes. Stirring was further performed at 90° C. for eight hours to conduct polymerization. The reaction was stopped to obtain a polymer (A) latex.

Next, 200 parts by weight of water and 0.5 parts by weight of sodium di(2-ethylhexyl) sulfosuccinate were mixed and nitrogen purging was performed at 72° C. Subsequently, 0.1 parts by weight of potassium persulfate was added, and a monomer mixture (B) containing 98 parts by weight of MMA and 2 parts by weight of BA was then continuously added under stirring over a period of 260 minutes. Stirring was further performed at 90° C. for eight hours to conduct polymerization. The reaction was stopped to obtain a polymer (B) latex.

Furthermore, 33 parts by weight of the polymer (A) latex and 49 parts by weight of the polymer (B) latex were mixed and nitrogen purging was performed at 72° C. Subsequently, 0.1 parts by weight of potassium persulfate was added, and a monomer mixture (C) containing 5.4 parts by weight of MMA and 12.6 parts by weight of BA was then continuously added under stirring over a period of 46 minutes. Stirring was further performed for one hour to conduct polymerization. The reaction was stopped to obtain a (meth)acrylic polymer latex. The resulting (meth)acrylic polymer was subjected to the same tests as those in Example 1. Tables 1 and 4 show the results.

Example 19

First, 200 parts by weight of water and 0.5 parts by weight of sodium di(2-ethylhexyl) sulfosuccinate were mixed and nitrogen purging was performed at 72° C. Subsequently, 0.035 parts by weight of potassium persulfate was added, and a monomer mixture (A) containing 80.36 parts by weight of MMA and 1.64 parts by weight of BA was then continuously added under stirring over a period of 215 minutes. Stirring was further performed for one hour to conduct polymerization. The reaction was stopped to obtain a polymer (A) latex.

To the polymer (A) latex, a monomer mixture (C) containing 5.4 parts by weight of MMA and 12.6 parts by weight of BA was continuously added over a period of 46 minutes. Stirring was further performed for one hour to conduct polymerization. The reaction was stopped to obtain a polymer (AC) latex.

Next, 200 parts by weight of water and 0.5 parts by weight of sodium di(2-ethylhexyl) sulfosuccinate were mixed and nitrogen purging was performed at 72° C. Subsequently, 0.09 parts by weight of potassium persulfate was added, and a monomer mixture (B) containing 80.36 parts by weight of MMA and 1.64 parts by weight of BA was then continuously added under stirring over a period of 215 minutes. Stirring was further performed for one hour to conduct polymerization. The reaction was stopped to obtain a polymer (B) latex.

To the polymer (B) latex, a monomer mixture (C) containing 5.4 parts by weight of MMA and 12.6 parts by weight of BA was continuously added over a period of 46 minutes. Stirring was further performed for one hour to conduct polymerization. The reaction was stopped to obtain a polymer (BC) latex.

Furthermore, 40 parts by weight of the polymer (AC) latex and 60 parts by weight of the polymer (BC) latex were mixed. A powdery (meth)acrylic polymer was then prepared as in Example 1. The (meth)acrylic polymer was subjected to the same tests as those in Example 1. Tables 2 and 4 show the results.

Example 20

A powdery polymer (AC) was prepared as in Example 1 from the polymer (AC) latex produced in Example 19. A powdery polymer (BC) was also prepared as in Example 1 from the polymer (BC) latex produced in Example 19.

Furthermore, 40 parts by weight of the powdery polymer (AC) and 60 parts by weight of the powdery polymer (BC) were mixed with a ribbon mixer, a Henschel mixer, or the like. The resulting polymer was subjected to the same tests as those in Example 1. Tables 2 and 4 show the results.

Comparative Example 1

A powdery (meth)acrylic polymer was prepared as in Example 1 except that the monomer mixture (A) in Example 1 was composed of 78.4 parts by weight of MMA and 1.6 parts by weight of BA, the time required for adding the monomer mixture (A) was 210 minutes, the amount of potassium persulfate used in polymerization of the monomer mixture (B) was 0.125 parts by weight, the monomer mixture (B) was composed of 12.0 parts by weight of MMA and 3.0 parts by weight of BMA, the time required for adding the monomer mixture (B) was 39 minutes, the monomer mixture (C) was composed of 1.5 parts by weight of MMA and 3.5 parts by weight of BA, and the time required for adding the monomer mixture (C) was 13 minutes. The (meth)acrylic polymer was subjected to the same tests as those in Example 1. Tables 3 and 4 show the results.

Comparative Example 2

A powdery (meth)acrylic polymer was prepared as in Example 1 except that the monomer mixture (A) in Example 1 was composed of 9.8 parts by weight of MMA and 0.2 parts by weight of BA, the time required for adding the monomer mixture (A) was 26 minutes, the amount of potassium persulfate used in polymerization of the monomer mixture (B) was 0.13 parts by weight, the monomer mixture (B) was composed of 68.0 parts by weight of MMA and 17.0 parts by weight of BMA, the time required for adding the monomer mixture (B) was 223 minutes, the monomer mixture (C) was composed of 1.5 parts by weight of MMA and 3.5 parts by weight of BA, and the time required for adding the monomer mixture (C) was 13 minutes. The (meth)acrylic polymer was subjected to the same tests as those in Example 1. Tables 3 and 4 show the results.

Comparative Example 3

A powdery (meth)acrylic copolymer was prepared as in Example 1 except that the monomer mixture (A) in Example 1 was composed of 32.34 parts by weight of methyl methacrylate and 0.66 parts by weight of butyl methacrylate, the time required for adding the monomer mixture (A) was 86 minutes, the amount of potassium persulfate used in polymerization of the monomer mixture (B) was 0.085 parts by weight, the monomer mixture (B) was composed of 45.08 parts by weight of methyl methacrylate and 3.92 parts by weight of butyl methacrylate, and the time required for adding the monomer mixture (B) was 129 minutes. The acrylic copolymer was subjected to the same tests as those in Example 1. Tables 3 and 4 show the results.

Comparative Example 4

A powdery polymer (AC) was prepared as in Example 1 except the following operations. First, 200 parts by weight of water and 0.5 parts by weight of sodium di(2-ethylhexyl) sulfosuccinate were mixed and nitrogen purging was performed at 66° C. Subsequently, 0.12 parts by weight of potassium persulfate was added, and a monomer mixture (A) containing 80.36 parts by weight of MMA and 1.64 parts by weight of BA was then continuously added under stirring over a period of 215 minutes. Stirring was further performed for one hour to conduct polymerization. The reaction was stopped to obtain a polymer (A) latex.

To the polymer (A) latex, a monomer mixture (C) containing 5.4 parts by weight of MMA and 12.6 parts by weight of BA was continuously added over a period of 46 minutes. Stirring was further performed for three hours to conduct polymerization. The reaction was stopped to obtain a polymer (AC) latex. The resulting powdery (meth)acrylic copolymer was subjected to the same tests as those in Example 1. Tables 3 and 4 show the results.

Comparative Example 5

A powdery (meth)acrylic polymer was prepared as in Comparative Example 4 except that the amount of potassium persulfate used in polymerization of the monomer mixture (A) in Comparative Example 4 was 0.25 parts by weight. The (meth)acrylic polymer was subjected to the same tests as those in Example 1. Tables 3 and 4 show the results.

Comparative Example 6

A powdery (meth)acrylic polymer was prepared as in Example 1 except that the amount of potassium persulfate used in polymerization of the monomer mixture (B) in Example 1 was 0.210 parts by weight. The (meth)acrylic polymer was subjected to the same tests as those in Example 1. Tables 3 and 4 show the results.

Comparative Example 7

A powdery (meth)acrylic polymer was prepared as in Example 9 except that the amount of potassium persulfate used in polymerization of the monomer mixture (A) in Example 9 was 0.012 parts by weight, and the amount of potassium persulfate used in polymerization of the monomer mixture (B) was 0.08 parts by weight. The (meth)acrylic polymer was subjected to the same tests as those in Example 1. Tables 3 and 4 show the results.

Comparative Example 8

A powdery (meth)acrylic polymer was prepared as in Example 1 except that the polymerization temperature in Example 1 was 72° C., the amount of potassium persulfate used in polymerization of the monomer mixture (A) was 0.045 parts by weight, the monomer mixture (A) was composed of 16.5 parts by weight of MMA and 16.5 parts by weight of BA, the amount of potassium persulfate used in polymerization of the monomer mixture (B) was 0.063 parts by weight, and the monomer mixture (B) was composed of 24.5 parts by weight of MMA and 24.5 parts by weight of BA. The (meth)acrylic polymer was subjected to the same tests as those in Example 1. Tables 3 and 4 show the results.

Comparative Example 9

A powdery (meth)acrylic polymer was prepared as in Example 1 except that the amount of potassium persulfate used in polymerization of the monomer mixture (B) in Example 1 was 0.03 parts by weight, and the monomer mixture (C) was composed of 16.2 parts by weight of MMA and 1.8 parts by weight of BA. The (meth)acrylic polymer was subjected to the same tests as those in Example 1. Tables 3 and 4 show the results.

Comparative Example 10

A powdery (meth)acrylic polymer was prepared as in Example 1 except the following operations. First, 200 parts by weight of water and 0.5 parts by weight of sodium di(2-ethylhexyl) sulfosuccinate were mixed and nitrogen purging was performed at 66° C. Subsequently, 0.14 parts by weight of potassium persulfate, and a monomer mixture (B) containing 48.02 parts by weight of MMA and 0.98 parts by weight of BA were continuously added over a period of 129 minutes. Stirring was further performed for one hour to conduct polymerization. The reaction was stopped to obtain a polymer (B) latex.

To the polymer (B) latex, a monomer mixture (A) containing 32.34 parts by weight of MMA and 0.66 parts by weight of BA was continuously added over a period of 86 minutes. Stirring was further performed for one hour to conduct polymerization. The reaction was stopped to obtain a polymer (BA) latex.

To the polymer (BA) latex, a monomer mixture (C) containing 5.4 parts by weight of MMA and 12.6 parts by weight of BA was continuously added over a period of 46 minutes to conduct emulsion polymerization. Stirring was further performed for three hours to conduct polymerization. The reaction was stopped to obtain a (meth)acrylic polymer (BAC) latex. The resulting (meth)acrylic polymer was subjected to the same tests as those in Example 1. Tables 3 and 4 show the results.

Comparative Example 11

A powdery (meth)acrylic polymer was prepared as in Example 11 except that the temperature during polymerization of the monomer mixture (C) in Example 11 was 90° C. and the monomer mixture (C) was added at once. The (meth)acrylic polymer was subjected to the same tests as those in Example 1. Tables 3 and 4 show the results.

Comparative Example 12

A powdery (meth)acrylic polymer was prepared as in Example 1 except that the monomer mixture (C) in Example 1 was composed of 5.4 parts by weight of MMA, 12.6 parts by weight of BA, and 0.01 parts by weight of tDM. The (meth)acrylic polymer was subjected to the same tests as those in Example 1. Tables 3 and 4 show the results.

Comparative Example 13

A powdery (meth)acrylic polymer was prepared as in Example 1 except the following operations. First, 200 parts by weight of water and 0.5 parts by weight of sodium di(2-ethylhexyl) sulfosuccinate were mixed and nitrogen purging was performed at 66° C. Subsequently, 0.07 parts by weight of potassium persulfate, and a monomer mixture (A) containing 39.2 parts by weight of MMA and 0.8 parts by weight of BA were continuously added over a period of 110 minutes. Stirring was further performed for one hour to conduct polymerization. The reaction was stopped to obtain a polymer (A) latex.

To the polymer (A) latex, a monomer mixture (B) containing 58.8 parts by weight of MMA and 1.2 parts by weight of BA was continuously added over a period of 156 minutes. Stirring was further performed for one hour to conduct polymerization. The reaction was stopped to obtain a polymer (AB) latex. The resulting (meth)acrylic polymer was subjected to the same tests as those in Example 1. Tables 3 and 4 show the results.

Comparative Example 14

A powdery (meth)acrylic polymer was prepared as in Example 1 except that the monomer mixture (A) in Example 1 was composed of 19.6 parts by weight of MMA and 0.4 parts by weight of BA, the time required for adding the monomer mixture (A) was 53 minutes, the monomer mixture (B) was composed of 29.4 parts by weight of MMA and 0.6 parts by weight of BA, the time required for adding the monomer mixture (B) was 79 minutes, the monomer mixture (C) was composed of 15 parts by weight of MMA and 35 parts by weight of BA, and the time required for adding the monomer mixture (C) was 125 minutes. The (meth)acrylic polymer was subjected to the same tests as those in Example 1. Tables 3 and 4 show the results.

Comparative Example 15

To the composition of the vinyl chloride-based resin described in Example 1, 0.005 parts by weight of the powdery (meth)acrylic polymer prepared in Comparative Example 1 was added. The physical properties were evaluated as in Example 1. Table 4 shows the results.

Comparative Example 16

To the composition of the vinyl chloride-based resin described in Example 1, 30 parts by weight of the powdery (meth)acrylic polymer prepared in Comparative Example 1 was added. The physical properties were evaluated as in Example 1. Table 4 shows the results.

TABLE 1

| | Polymer (A) | | | Polymer (B) | | | Polymer (C) | | | | Specific viscosity of |
|---|---|---|---|---|---|---|---|---|---|---|---|
| | Parts by weight | Specific viscosity | Composition | Parts by weight | Specific viscosity | Composition | Parts by weight | Specific viscosity | Composition | a/b | (meth)acrylic polymer |
| Example 1 | 33 | 1.18 | MMA98/BA2 | 49 | 0.70 | MMA98/BA2/tDM0.009 | 18 | 1.33 | MMA30/BA70 | 1.7 | 0.97 |
| Example 2 | 30 | 1.17 | MMA98/BA2 | 45 | 0.70 | MMA98/BA2/tDM0.019 | 25 | 1.35 | MMA30/BA70 | 1.7 | 1.00 |
| Example 3 | 26 | 1.17 | MMA98/BA2 | 42 | 0.70 | MMA98/BA2/tDM0.019 | 30 | 1.40 | MMA30/BA70 | 1.7 | 1.04 |
| Example 4 | 18 | 1.15 | MMA98/BA2 | 64 | 0.85 | MMA92/BA8 | 18 | 1.30 | MMA30/BA70 | 1.4 | 0.99 |

TABLE 1-continued

|  | Polymer (A) | | | Polymer (B) | | | Polymer (C) | | | a/b | Specific viscosity of (meth)acrylic polymer |
|---|---|---|---|---|---|---|---|---|---|---|---|
|  | Parts by weight | Specific viscosity | Composition | Parts by weight | Specific viscosity | Composition | Parts by weight | Specific viscosity | Composition | | |
| Example 5 | 23 | 1.16 | MMA98/BA2 | 59 | 0.67 | MMA98/BA2/tDM0.019 | 18 | 1.24 | MMA30/BA70 | 1.7 | 0.89 |
| Example 6 | 49 | 1.20 | MMA98/BA2 | 33 | 0.68 | MMA98/BA2/tDM0.019 | 18 | 1.30 | MMA30/BA70 | 1.8 | 1.11 |
| Example 7 | 39 | 1.18 | MMA98/BA2 | 43 | 0.68 | MMA98/BA2/tDM0.019 | 18 | 1.40 | MMA30/BA70 | 1.7 | 1.01 |
| Example 8 | 33 | 1.31 | MMA100 | 49 | 0.44 | MMA100 | 18 | 1.16 | MMA30/BA70 | 2.0 | 0.86 |
| Example 9 | 33 | 1.49 | MMA80/BMA20 | 49 | 0.60 | MMA98/BA2/tDM0.019 | 18 | 1.20 | MMA30/BA70 | 2.5 | 1.00 |
| Example 10 | 33 | 1.84 | MMA80/BMA20 | 49 | 0.88 | MMA92/BA8 | 18 | 1.11 | MMA30/BA70 | 2.1 | 1.24 |
| Example 11 | 33 | 1.09 | MMA98/BA2 | 49 | 0.69 | MMA98/BA2 | 18 | 1.66 | MMA30/BA70 | 1.6 | 1.00 |
| Example 12 | 33 | 1.10 | MMA98/BA2 | 49 | 0.70 | MMA98/BA2 | 18 | 1.89 | MMA30/BA70 | 1.6 | 1.05 |
| Example 13 | 33 | 1.38 | MMA76/BMA24 | 49 | 0.82 | MMA76/BMA16/BA8 | 18 | 1.05 | MMA30/BA70 | 1.7 | 1.05 |
| Example 14 | 33 | 1.18 | MMA98/BA2 | 49 | 0.88 | MMA92/BA8 | 18 | 1.06 | MMA60/BA40 | 1.3 | 1.02 |
| Example 15 | 33 | 1.10 | MMA80/BMA20 | 49 | 0.64 | MMA98/BA2 | 18 | 1.49 | MMA30/BA70 | 1.7 | 0.95 |
| Example 16 | 33 | 1.28 | MMA98/BA2 | 49 | 0.75 | MMA80/BMA20 | 18 | 1.20 | MMA30/BA70 | 1.5 | 1.10 |
| Example 17 | 33 | 1.14 | MMA80/BMA20 | 49 | 0.62 | MMA98/BA2 | 5($C_1$) | 1.49($C_1$) | MMA30/BA70($C_1$) | 1.8 | 0.94 |
|  |  |  |  |  |  |  | 13($C_2$) | 1.40($C_2$) | MMA30/BA70($C_2$) |  |  |
| Example 18 | 33 | 1.21 | MMA98/BA2 | 49 | 0.70 | MMA98/BA2 | 18 | 1.32 | MMA30/BA70 | 1.7 | 0.98 |

TABLE 2

| | Polymer mixture (AC) | | | | | | | Polymer mixture (BC) | | | |
|---|---|---|---|---|---|---|---|---|---|---|---|
| | | Polymer (A) | | | | Polymer (C) | | | Polymer (B) | | |
| | Parts | Parts | Specific viscosity | Composition | Parts | Specific viscosity | Composition | Parts | Parts | Specific viscosity | Composition |
| Example 19 | 40 | 82 | 1.18 | MMA98/BA2 | 18 | 1.48 | MMA30/BA70 | 60 | 82 | 0.65 | MMA98/BA2 |
| Example 20 | 40 | 82 | 1.20 | MMA98/BA2 | 18 | 1.48 | MMA30/BA70 | 60 | 82 | 0.70 | MMA98/BA2 |

| | Polymer mixture (BC) | | | | |
|---|---|---|---|---|---|
| | Polymer (C) | | | | Specific viscosity of (meth)acrylic polymer |
| | Parts | Specific viscosity | Composition | a/b | |
| Example 19 | 18 | 1.28 | MMA30/BA70 | 1.8 | 0.95 |
| Example 20 | 18 | 1.28 | MMA30/BA70 | 1.7 | 0.92 |

TABLE 3

|  | Polymer (A) | | | Polymer (B) | | | Polymer (C) | | | a/b | Specific viscosity of (meth)acrylic polymer |
|---|---|---|---|---|---|---|---|---|---|---|---|
|  | Parts | Specific viscosity | Composition | Parts | Specific viscosity | Composition | Parts | Specific viscosity | Composition | | |
| Comparative Example 1 | 80 | 1.26 | MMA98/BA2 | 15 | 0.81 | MMA80/BMA20 | 5 | 1.19 | MMA30/BA70 | 1.6 | 1.17 |
| Comparative Example 2 | 10 | 1.14 | MMA98/BA2 | 85 | 0.87 | MMA80/BMA20 | 5 | 1.18 | MMA30/BA70 | 1.3 | 0.93 |
| Comparative Example 3 | 33 | 1.18 | MMA98/BA2 | 49 | 0.98 | MMA92/BA8 | 18 | 1.42 | MMA30/BA70 | 1.2 | 1.13 |
| Comparative Example 4 | 82 | 0.91 | MMA98/BA2 | — | — | — | 18 | 1.51 | MMA30/BA70 | 1.0 | 1.02 |
| Comparative Example 5 | 82 | 0.58 | MMA98/BA2 | — | — | — | 18 | 1.19 | MMA30/BA70 | 1.0 | 0.69 |
| Comparative Example 6 | 33 | 1.26 | MMA98/BA2 | 49 | 0.38 | MMA98/BA2/tDM0.009 | 18 | 1.07 | MMA30/BA70 | 3.3 | 0.77 |
| Comparative Example 7 | 33 | 2.90 | MMA80/BMA20 | 49 | 0.80 | MMA98/BA2/tDM0.018 | 18 | 1.45 | MMA30/BA70 | 3.6 | 1.61 |
| Comparative Example 8 | 33 | 1.19 | MMA50/BA50 | 49 | 0.66 | MMA50/BA50 | 18 | 1.13 | MMA30/BA70 | 1.8 | 0.92 |

TABLE 3-continued

|  | Polymer (A) | | | Polymer (B) | | | Polymer (C) | | | | Specific viscosity of (meth)acrylic polymer |
|---|---|---|---|---|---|---|---|---|---|---|---|
|  | Parts | Specific viscosity | Composition | Parts | Specific viscosity | Composition | Parts | Specific viscosity | Composition | a/b | |
| Comparative Example 9 | 33 | 1.21 | MMA98/BA2 | 49 | 0.68 | MMA98/BA2/ tDM0.009 | 18 | 1.10 | MMA90/BA10 | 1.8 | 0.93 |
| Comparative Example 10 | 33 | 0.78 | MMA98/BA2 | 49 | 0.75 | MMA98/BA2 | 18 | 1.49 | MMA30/BA70 | 1.0 | 0.89 |
| Comparative Example 11 | 33 | 1.08 | MMA98/BA2 | 49 | 0.68 | MMA98/BA2 | 18 | 2.25 | MMA30/BA70 | 1.5 | 1.18 |
| Comparative Example 12 | 33 | 1.19 | MMA98/BA2 | 49 | 0.71 | MMA98/BA2/ tDM0.009 | 18 | 0.58 | MMA30/BA70/ tDM0.019 | 1.7 | 0.85 |
| Comparative Example 13 | 40 | 1.20 | MMA98/BA2 | 60 | 0.72 | MMA98/BA2 | 0 | — | — | 1.7 | 0.91 |
| Comparative Example 14 | 20 | 1.15 | MMA98/BA2 | 30 | 0.67 | MMA98/BA2 | 50 | 1.52 | MMA30/BA70 | 1.7 | 0.98 |

TABLE 4

|  | Flow mark | Air mark | Gloss | T (%) | F.E. | Gelation time (min) |
|---|---|---|---|---|---|---|
| Example 1 | 4 | 4 | 4 | A | A | 1.2 |
| Example 2 | 4 | 4 | 4 | A | A | 1.3 |
| Example 3 | 4 | 3 | 4 | A | A | 1.4 |
| Example 4 | 5 | 3 | 3 | A | A | 1.4 |
| Example 5 | 5 | 4 | 3 | A | A | 1.4 |
| Example 6 | 3 | 4 | 4 | A | A | 1.0 |
| Example 7 | 4 | 4 | 4 | A | A | 1.2 |
| Example 8 | 5 | 3 | 3 | A | A | 1.4 |
| Example 9 | 4 | 4 | 5 | A | A | 1.5 |
| Example 10 | 3 | 4 | 5 | B | B | 1.5 |
| Example 11 | 4 | 4 | 4 | A | A | 1.3 |
| Example 12 | 3 | 4 | 4 | B | A | 1.4 |
| Example 13 | 4 | 4 | 3 | B | B | 1.6 |
| Example 14 | 4 | 4 | 4 | B | B | 1.3 |
| Example 15 | 4 | 3 | 3 | B | B | 1.5 |
| Example 16 | 4 | 4 | 3 | B | B | 1.5 |
| Example 17 | 4 | 3 | 3 | B | A | 1.4 |
| Example 18 | 4 | 4 | 4 | A | A | 1.2 |
| Example 19 | 4 | 4 | 4 | A | A | 1.3 |
| Example 20 | 4 | 4 | 4 | A | A | 1.0 |
| Comparative Example 1 | 2 | 4 | 4 | A | B | 1.4 |
| Comparative Example 2 | 5 | 2 | 2 | A | B | 1.6 |
| Comparative Example 3 | 1 | 4 | 5 | A | A | 1.2 |
| Comparative Example 4 | 2 | 4 | 4 | A | A | 1.2 |
| Comparative Example 5 | 5 | 2 | 2 | A | A | 1.4 |
| Comparative Example 6 | 5 | 1 | 1 | C | A | 1.6 |
| Comparative Example 7 | 1 | 5 | 5 | C | C | 0.9 |
| Comparative Example 8 | 4 | 1 | 1 | C | A | 3.2 |
| Comparative Example 9 | 4 | 2 | 2 | A | D | 1.2 |
| Comparative Example 10 | 4 | 2 | 2 | A | A | 1.4 |
| Comparative Example 11 | 2 | 4 | 4 | B | B | 1.6 |
| Comparative Example 12 | 4 | 2 | 3 | A | A | 1.0 |
| Comparative Example 13 | 4 | 2 | 2 | C | D | 0.9 |
| Comparative Example 14 | 4 | 1 | 1 | C | A | 2.4 |
| Comparative Example 15 | 5 | 1 | 1 | B | A | 10.5 |
| Comparative Example 16 | 1 | 5 | 5 | D | B | 0.5 |

According to the results in Tables 1, 2, 3, and 4, in Example 1, a sheet in which the flow mark, the air mark, and the F.E. are suppressed, the sheet having excellent gloss, can be produced.

According to the results of Comparative Examples 1 and 2 and Examples 1 and 4 to 7, when the content of the polymer (A) or (B) in the (meth)acrylic polymer is out of the range specified in the present invention, the flow mark, the air mark, or the gloss is not satisfactory. In contrast, when the content of the polymer (A) or (B) in the (meth)acrylic polymer is in the range specified in the present invention, the resulting sheets are excellent in terms of the flow mark, the air mark, and the gloss.

According to the results of Examples 1, 2, and 3 and Comparative Examples 13 and 14, when the content of the polymer (C) in the (meth)acrylic polymer exceeds 30 parts by weight, the air mark, the gloss, and the gelation are not satisfactory. Furthermore, when the content of the polymer (C) in the (meth)acrylic polymer is less than 1 part by weight, the air mark, the gloss, and the F.E. are not satisfactory. In contrast, when the polymer (C) in the (meth)acrylic polymer is in the range specified in the present invention, the resulting sheets are excellent in terms of the air mark, the gloss, the gelation, and the F.E.

According to the results of Examples 1, 10, and 11 and Comparative Examples 7 and 10, when the specific viscosity of the polymer (A) exceeds 2.00, the flow mark, the transparency, and the F.E are not satisfactory. Furthermore, when the specific viscosity of the polymer (A) is less than 0.90, the air mark and the gloss are not satisfactory. In contrast, when the specific viscosity of the polymer (A) is in the range specified in the present invention, the resulting sheets are excellent in terms of the flow mark, the air mark, the gloss, and the transparency.

According to the results of Examples 1, 8, and 10 and Comparative Examples 3 and 6, when the specific viscosity of the polymer (B) is 0.90 or more, the flow mark is not satisfactory. Furthermore, when the specific viscosity of the polymer (B) is less than 0.40, the air mark and the gloss are not satisfactory. In contrast, when the specific viscosity of the polymer (B) is in the range specified in the present invention, the resulting sheets are excellent in terms of the flow mark, the air mark, and the gloss.

According to the results of Examples 1, 11, 12, and 13 and Comparative Examples 11 and 12, when the specific viscosity of the polymer (C) exceeds 2.00, the flow mark is not satisfactory. Furthermore, when the specific viscosity of the polymer (C) is less than 0.8, the air mark is not satisfactory. In contrast, when the specific viscosity of the polymer (C) is in the range specified in the present invention, the resulting sheets are excellent in terms of the flow mark and the air mark.

According to the results of Examples 1, 13, and 15 to 17 and Comparative Example 8, when the ratios by weight of the (meth)acrylic esters other than methyl methacrylate in the polymers (A) and (B) exceed 30 weight percent, the air mark, the gloss, the transparency, and the gelation are not satisfactory. In contrast, when the ratios by weight of the (meth)acrylic esters other than methyl methacrylate in the polymers (A) and (B) are in the ranges specified in the present invention, the resulting sheets are excellent in terms of the flow mark, the air mark, the gloss, the transparency, and the gelation.

According to the results of Examples 1 and 14 and Comparative Example 9, when the ratio by weight of the (meth)acrylic ester other than methyl methacrylate in the polymer (C) is less than 40 weight percent, in particular, the F.E. is not satisfactory. In contrast, when the ratio by weight of the (meth)acrylic ester other than methyl methacrylate in the polymer (C) is in the range specified in the present invention, the resulting sheets are excellent in terms of the F.E.

According to the results of Example 1 and Comparative Examples 15 and 16, when the number of parts by weight of the (meth)acrylic polymer mixed in the vinyl chloride-based resin exceeds 20 parts by weight, the flow mark and the transparency are not satisfactory. Furthermore, when the number of parts by weight of the (meth)acrylic polymer mixed in the vinyl chloride-based resin is less than 0.1 parts by weight, the air mark, the gloss, and the gelation are not satisfactory. In contrast, when the number of parts by weight of the (meth)acrylic polymer mixed in the vinyl chloride-based resin is in the range specified in the present invention, the resulting sheet is excellent in terms of the flow mark, the air mark, the gloss, the transparency, and the gelation.

The invention claimed is:

1. A (meth)acrylic polymer comprising
   15 to 65 parts by weight of a polymer (A) having a specific viscosity of 0.90 to 2.00 and containing 70 to 100 weight percent of methyl methacrylate, 0 to 30 weight percent of a (meth)acrylic ester other than methyl methacrylate, and 0 to 10 weight percent of another monomer copolymerizable with these;
   20 to 75 parts by weight of a polymer (B) having a specific viscosity of 0.40 or more and less than 0.90 and containing 70 to 100 weight percent of methyl methacrylate, 0 to 30 weight percent of a (meth)acrylic ester other than methyl methacrylate, and 0 to 10 weight percent of another monomer copolymerizable with these; and
   1 to 30 parts by weight of a polymer (C) having a specific viscosity of 0.80 to 2.00 and containing 1 to 40 weight percent of methyl methacrylate, 40 to 100 weight percent of a (meth)acrylic ester other than methyl methacrylate, and 0 to 20 weight percent of another monomer copolymerizable with these (the total of the polymer (A), the polymer (B), and the polymer (C) is 100 parts by weight),
   wherein when the specific viscosity of the polymer (A) is represented as a and the specific viscosity of the polymer (B) is represented as b, a/b is 1.2 to 3.2, and
   the another monomer does not comprise an aromatic vinyl compound.

2. The (meth)acrylic polymer according to claim 1, wherein the (meth)acrylic polymer is a multistage polymer comprising the polymer (A), the polymer (B), and the polymer (C).

3. The (meth)acrylic polymer according to claim 2, wherein the multistage polymer is prepared by multistage polymerization in the order of the polymer (A), the polymer (B), and the polymer (C).

4. The (meth)acrylic polymer according to claim 2, wherein the multistage polymer is prepared by multistage polymerization in the order of the polymer (B), the polymer (A), and the polymer (C).

5. A vinyl chloride-based resin composition comprising 100 parts by weight of a vinyl chloride-based resin and 0.1 to 20 parts by weight of the (meth)acrylic polymer according to claim 1.

6. A vinyl chloride-based resin composition comprising 100 parts by weight of a vinyl chloride-based resin and 0.1 to 20 parts by weight of the (meth)acrylic polymer according to claim 2.

7. A vinyl chloride-based resin composition comprising 100 parts by weight of a vinyl chloride-based resin and 0.1 to 20 parts by weight of the (meth)acrylic polymer according to claim 3.

8. A vinyl chloride-based resin composition comprising 100 parts by weight of a vinyl chloride-based resin and 0.1 to 20 parts by weight of the (meth)acrylic polymer according to claim 4.

* * * * *